United States Patent
Kamrath et al.

(10) Patent No.: US 6,902,232 B2
(45) Date of Patent: Jun. 7, 2005

(54) AUTOMATIC FOLD AND RETURN HEAD RESTRAINT

(75) Inventors: Robert R. Kamrath, Grand Rapids, MI (US); Robert R. Sutter, Jr., Belmont, MI (US)

(73) Assignee: Gill Industries, Inc., Grand Rapids, MI (US)

( * ) Notice: Subject to any disclaimer, the term of this patent is extended or adjusted under 35 U.S.C. 154(b) by 0 days.

(21) Appl. No.: 10/672,703

(22) Filed: Sep. 26, 2003

(65) Prior Publication Data

US 2005/0067874 A1     Mar. 31, 2005

(51) Int. Cl.[7] .................................................. A47C 1/02
(52) U.S. Cl. ................................................................ 297/61
(58) Field of Search ........................... 297/391, 61, 404, 297/408

(56) References Cited

U.S. PATENT DOCUMENTS

| | | | |
|---|---|---|---|
| 2,976,915 A * | 3/1961 | Spound | 297/61 |
| 2,984,293 A * | 5/1961 | Bontempi et al. | 297/61 |
| 3,065,029 A * | 11/1962 | Spound et al. | 297/391 |
| 3,695,700 A | 10/1972 | Flach | |
| 4,353,595 A * | 10/1982 | Kaneko et al. | 297/408 |
| 4,600,240 A | 7/1986 | Suman et al. | |
| 4,830,434 A | 5/1989 | Ishida et al. | |
| 5,145,233 A | 9/1992 | Nagashima | |
| 5,181,758 A | 1/1993 | Sandvik | |
| 5,346,277 A | 9/1994 | Holobaugh et al. | |
| 5,642,918 A | 7/1997 | Sakamoto et al. | |
| 5,681,079 A | 10/1997 | Robinson | |
| 5,738,411 A | 4/1998 | Sutton et al. | |
| 5,826,942 A | 10/1998 | Sutton et al. | |
| 5,913,570 A | 6/1999 | Yoshida | |
| 5,918,940 A | 7/1999 | Wakamatsu et al. | |
| 5,927,804 A * | 7/1999 | Cuevas | 297/216.12 |
| 6,024,405 A | 2/2000 | MacAndrew et al. | |
| 6,050,633 A | 4/2000 | Droual | |
| 6,192,565 B1 | 2/2001 | Tame | |
| 6,305,749 B1 | 10/2001 | O'Connor et al. | |
| 6,371,558 B1 | 4/2002 | Couasnon | |
| 6,371,559 B1 | 4/2002 | Kienzle et al. | |
| 6,375,264 B1 | 4/2002 | Kienzle et al. | |
| 6,517,156 B1 * | 2/2003 | Lin | 297/284.4 |
| 6,612,653 B2 * | 9/2003 | Takata | 297/408 |

* cited by examiner

*Primary Examiner*—Milton Nelson, Jr.
(74) *Attorney, Agent, or Firm*—Warner Norcross & Judd LLP (57) ABSTRACT

A headrest attached to a seatback automatically pivots to a stowed position as the seatback is folded forward. The headrest pivots to a stowed position so that the seat back may lay flat when folded. When the seatback is returned to the upright position, the headrest is returns to its original extended position.

76 Claims, 8 Drawing Sheets

AUTOMATIC FOLD AND RETURN HEAD RESTRAINT

BACKGROUND OF THE INVENTION

This invention relates to vehicle seats and more particularly headrests.

Most vehicles have one, two or three rows of vehicle seats for the driver and passengers. In some motor vehicles such as minivans and sport utility vehicles, a storage area is located behind the last row of seats. In order to access rows of seats or the storage area, at the back of the vehicle, vehicle seats often fold forward to allow easier access or to increase the size of the storage area.

When folded forward, the headrest for the vehicle seat over strikes the dashboard or the seat immediately before it. The contact of the headrest with the seat or dashboard creates several problems. First, the seat never becomes fully folded, thus limiting the amount of space available to a passenger to enter a rear seat. Second, when the seat is initially folded, the headrest may violently come into contact with the dashboard, potentially causing damage to the dashboard or the headrest. Third, after the seat is folded, the headrest may be forced into the dashboard as the passenger enters the rear seat, again potentially damaging the dashboard or the headrest, or both.

To address this problem, some vehicle seats can be slid backward to allow the seat to fully fold. However, the user must manually move the seat backward, and, if the storage area has been loaded with cargo prior to folding down the seat, the cargo must be moved. This results in inconvenience to the user as to both time and effort in using the storage area.

Other seats use a headrest retractable into the seatback. While such a seatback/headrest combination does allow the seatback to be fully folded forward without moving the seat, additional problems arise. The seatback has to be substantially modified to accommodate the headrest. The cavity within the seat for the headrest may structurally weaken the seat, creating a potential risk to passengers. Finally, because a significant portion of the upper part of the seat is dedicated to the cavity for the headrest, ergonomic design of the seat is further complicated, requiring a complex design to supply padding and appropriate passenger support.

A headrest which allows the seat to be fully folded forward without requiring additional effort by the user and which does not require extensive modifications to the seat is desirable.

SUMMARY OF THE INVENTION

The headrest and seat described herein allow the placement of the seatback into a full folded position. As the seatback is rotated forward, the headrest pivots from an extended position into a stowed position, thus avoiding contact with the preceding seat or the dashboard.

The headrest includes a mounting bracket and a rotational shaft. The mounting bracket is attached to the seatback, while the rotation shaft is mounted within the mounting bracket. A cable is attached to the headrest and the seat or the motor vehicle. As the seatback is rotated forward, the headrest pivots into the stowed position. A lock to prevent motion of the headrest when the seatback is in the upright position is provided. A clutch, circumferentially mounted about the rotation shaft, controls the engagement of the lock with the headrest. Upon rotation of the seatback, the clutch disengages the lock from the headrest. Additional rotation of the seatback causes the headrest to reach a stowed position.

Such a seat and headrest provides significant advantages. First, the mechanism for pivoting the headrest is contained substantially within the headrest. No significant modification of the seatback is required. Second, seatbacks currently used in motor vehicles could use the headrest with only minor modifications. Current seats could be retrofitted with little problem with the headrest. Finally, the headrest is automatically stowed as the seatback is rotated forward. A user is not required to perform any additional tasks.

These and other objects, advantages and features of the invention will be more readily understood and appreciated by reference to the detailed description of the drawings.

DETAILED DESCRIPTION OF THE DRAWINGS

Figure 1:
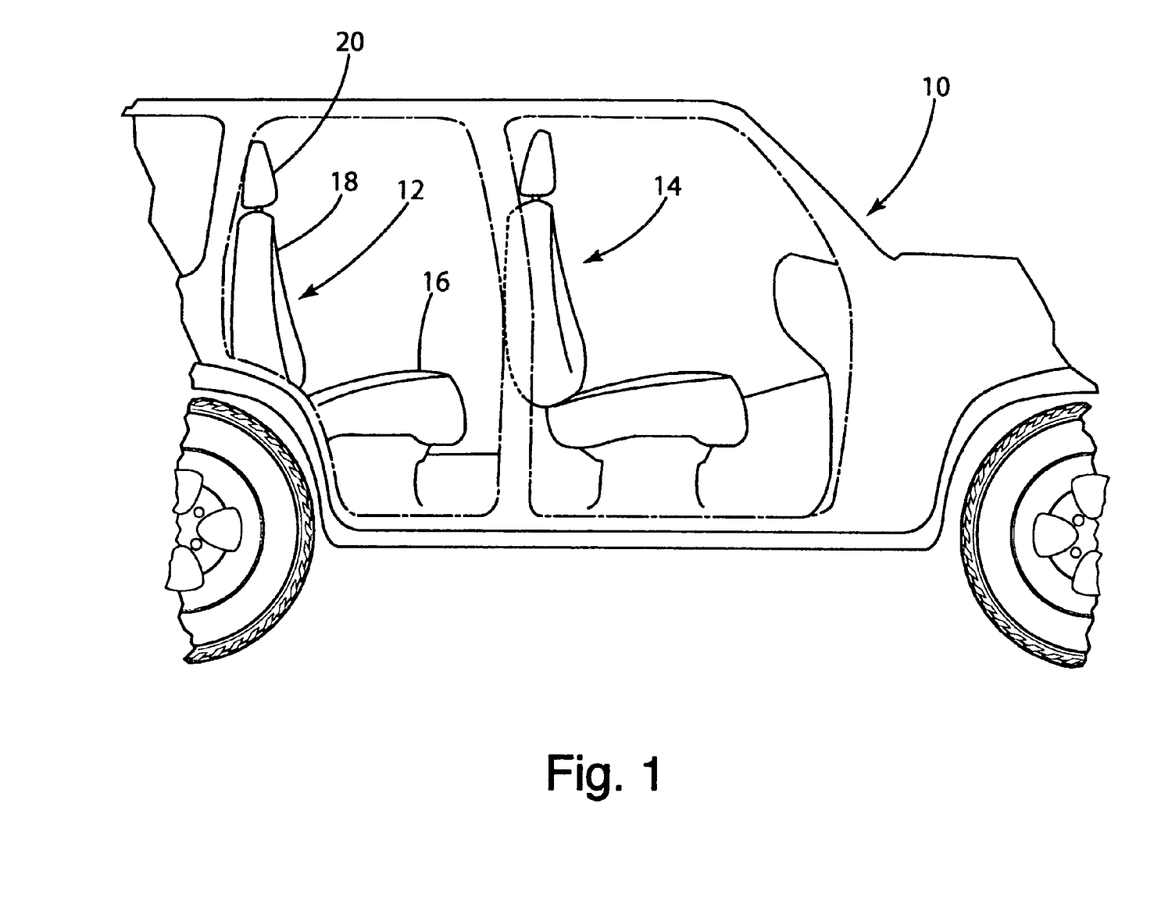
FIG. 1 shows the interior of a motor vehicle.

FIG. 1 shows a motor vehicle 10 with seats 12,14. Rear seat 12 has seat pan 16, seatback 18, and headrest 20 Rear seat 12 is in an upright position. A storage area is located behind seat 12. As shown in FIG. 1, headrest 20 is in the extended position.

Figure 2:
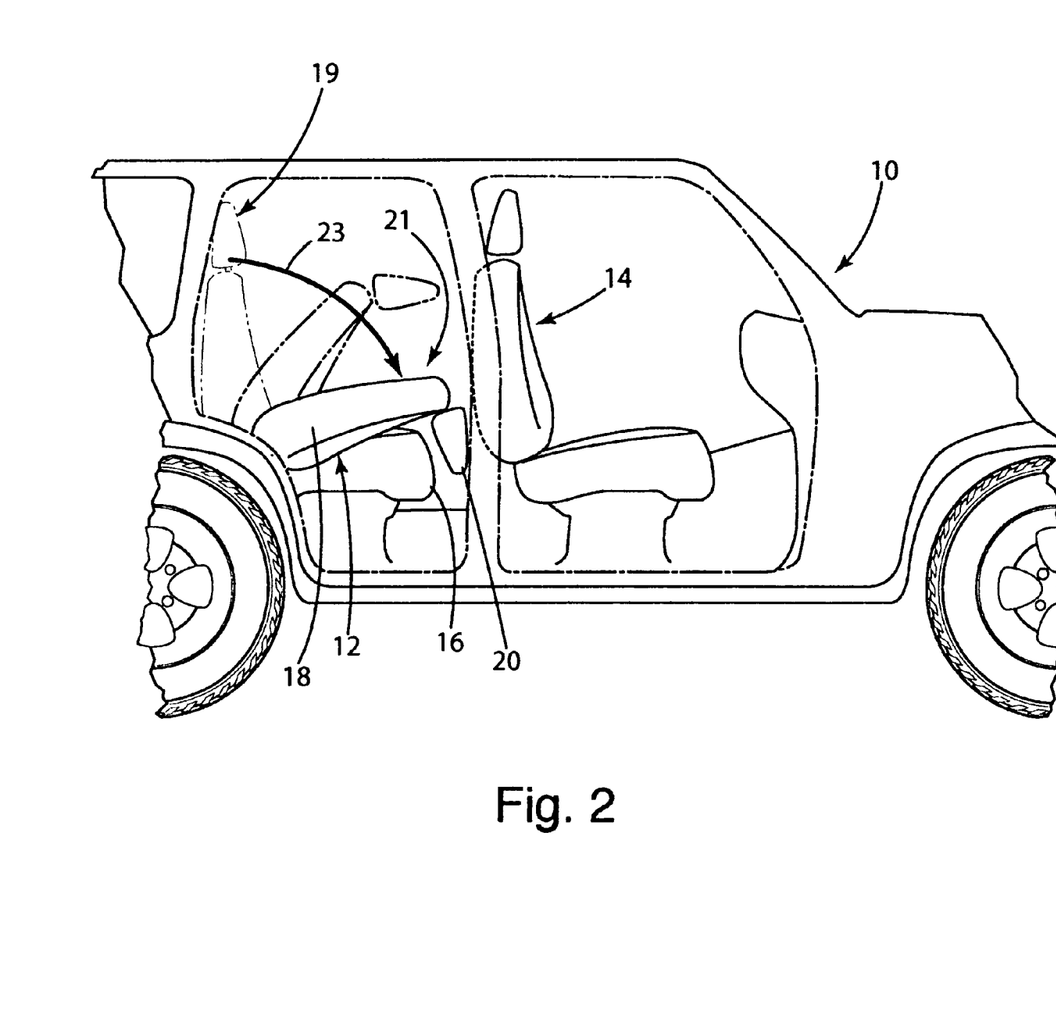
FIG. 2 shows the movement of a seatback and the headrest of the motor vehicle.

FIG. 2 shows motor vehicle 10 rear seat 12 in the fully folded position. Seatback 18 is moveable. As seatback 18 is rotated to the fully folded position 21, headrest 20 also rotates forward. When seatback 18 is in the fully folded position 21, headrest 20 has been rotated such that the headrest tucks between the front of seat pan 16 and the back of front seat 14. The headrest 20 could rotate at least seventy degrees or at least 100 hundred degrees, depending upon the specific requirements for rear seat 12, front seat 14, and headrest 20. Headrest 20 in FIG. 2 is shown in the stowed position.

When seatback 18 is between the full upright position 19 and the fully folded position 21, it is in the partially folded position 23. Headrest 20 is then in a partially stowed position. Seatback 18 moves a seatback distance through a seatback rotational angle along seatback arc 23.

When the rear seat 12 is fully folded forward, the storage area is thus significantly expanded. Since the headrest 20 has been stored between the back of front seat 14 and the front of seat pan 16, headrest 20 is protected from damage by any cargo loaded into the storage area. Further, cargo laid on the back of rear seat 12 will not force headrest 20 into either the back of front seat 14 or the floor of the motor vehicle, thus preserving headrest 20.

Figure 3:
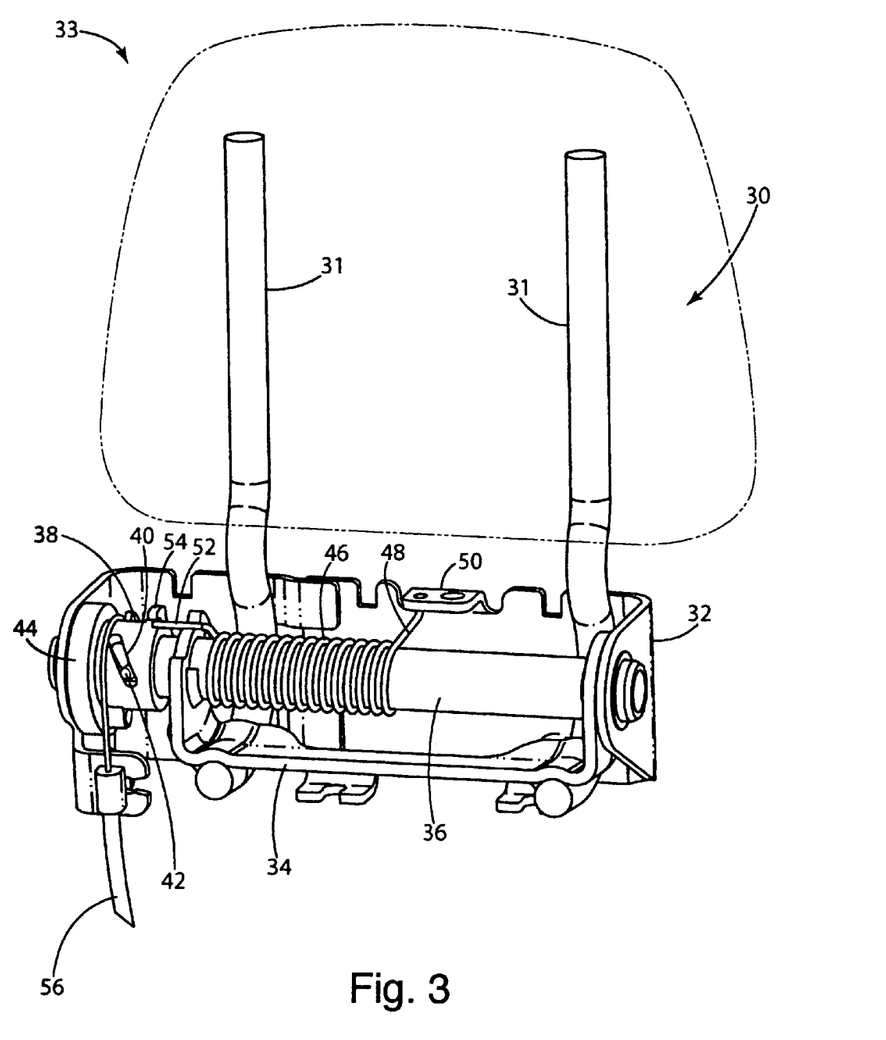
FIG. 3 shows a headrest mechanism.

FIG. 3 shows a headrest mechanism 30. Headrest mechanism 30 is contained substantially within seat back 18. Mounting bracket 32 is U-shaped and contains rotation bracket 34. Headrest prongs 31 are likewise attached to rotation bracket 34.

Rotatable shaft 36 is fixedly attached to rotation bracket 34, and extends through the first side of mounting bracket 32, allowing rotation bracket 34 to move relative to mounting bracket 32. Clutch 38 is circumferentially positioned around rotatable shaft 36. Clutch 38 is substantially cylindrical, and contains cam 40. Since clutch 38 is substantially cylindrical, it has a clutch axis. Cam 40 traverses clutch 38 at an angle with the clutch axis.

Pin 42 extends axially from rotatable shaft 36, and rests within cam 40. Bun 33 thus is pivotal about an axis defined by rotatable shaft 36.

Lock 44 is juxtaposed with cam 40 and with the second side of mounting bracket 32. Hook 39 of clutch 38 latches to lock 44. As clutch 38 is rotated, the force of pin 42 on cam 40 causes clutch 38 to translate longitudinally along rotatable shaft 36. Lock 44 similarly moves along rotatable shaft 36.

Spring 46 is placed at least partially about rotatable shaft 36. First spring end 48 of spring 46 is connected to stop 50. Second spring end 52 is connected to lever arm 54 of clutch 38. Spring 46 keeps clutch 38 biased against lock 44 by applying a force on lever arm 54, causing cam 40, to exert a force on pin 42, thereby moving clutch 38 toward lock 44. The force applied by clutch 38 to lock 44 also biases lock 44 into the second side of mounting bracket 32. Cable 56 is attached at one end to clutch 38. Cable 56 is attached at its other end to any point which moves relative to seat back 18 and headrest 20. One suitable attachment point for the other end of cable 56 would be seat pan 16. Cable 56 would have a fixed length.

Figure 4:
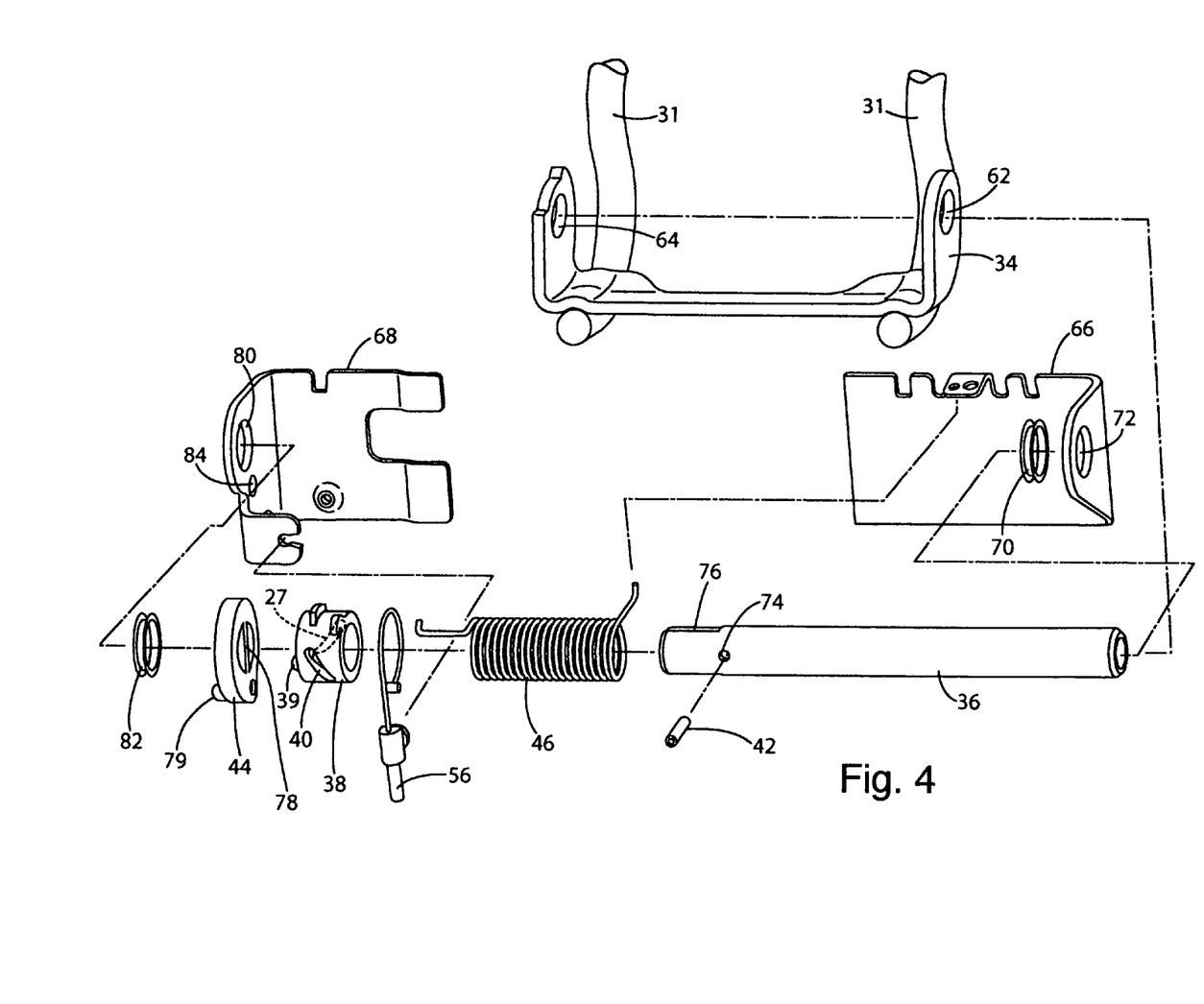
FIG. 4 is an exploded view of the headrest mechanism.

FIG. 4 is an exploded view of headrest mechanism 30. Mounting bracket 32 has first mounting bracket side 60 and second mounting bracket side 62.

Rotatable shaft 36 rests within first rotation bracket hole 62 and second rotation bracket hole 64. Rotatable shaft 36 is secured to rotation bracket 34 by, for example, welding.

Mounting bracket 32 has a first mounting bracket plate 66 and a second mounting bracket plate 68. First bushing 70 resides within first mounting bracket hole 72. Rotatable shaft 36 extends through first mounting bracket hole 72.

Spring 46 resides around rotatable shaft 36. A portion of pin 42 is placed within hole 74. Pin 42 also extends axially from either side of rotatable shaft 36. Slot 76 extends longitudinally along a first end of rotatable shaft 36. Clutch 38 rests around rotatable shaft 36. Clutch 38 has latch 75. Latch 39 attaches to a lip in lock 44, allowing clutch 38 to pull lock 44. Lock 44 and clutch 38 are juxtaposed and slide upon rotatable shaft 36. Clutch 38 has first cam 40 and second cam 77. Pin 42 extends into first cam 40 and second cam 77. Lock 44 has button 79.

Cable 56 surrounds and is affixed to clutch 38. Cross-member 78 of lock 44 moveably resides within slot 76 of rotatable shaft 36. A second end of rotatable shaft 36 extends through second mounting bracket hole 80 and bushing 82. Button 79 may extend through button aperture 84, depending upon the position of the lock 44 relative to second mounting bracket plate 68.

FIGS. 5–13 show headrest mechanism 30 and illustrate the operation of headrest mechanism 30.

Figure 5:
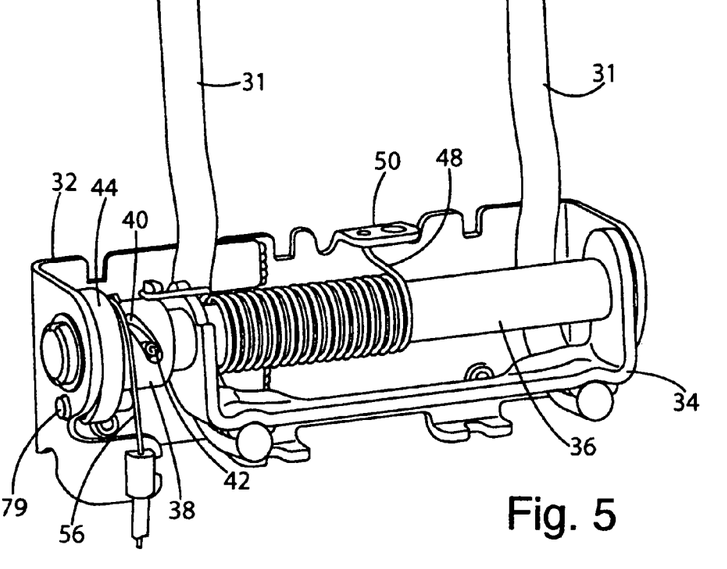
FIG. 5 shows the headrest mechanism in the extended, locked position.
Figure 6:
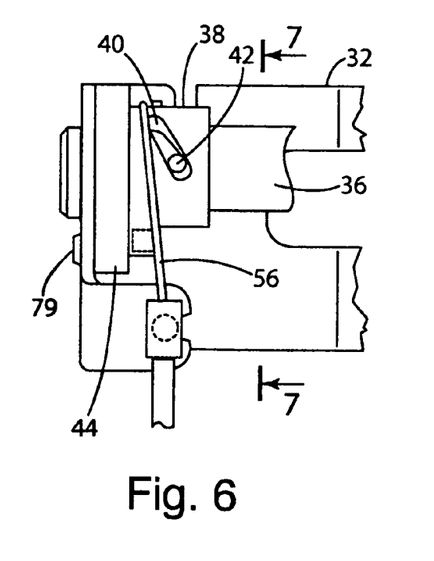
FIG. 6 is a front plan view the mounting bracket, rotatable shaft, clutch, lock and cable of the headrest in the locked position.
Figure 7:
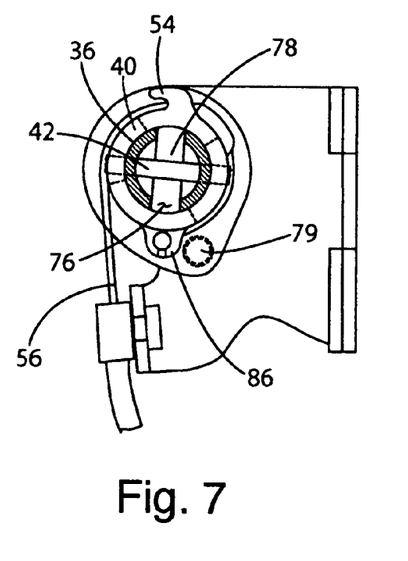
FIG. 7 is a side plan view the mounting bracket, rotatable shaft, clutch, lock and cable of the headrest in the locked position.

FIGS. 5–7 show headrest mechanism 30 in the locked position. Headrest 20 would thus be in the extended position. Button 79 is shown extending through mounting bracket 32. Pin 42 of clutch 38 is in a first pin position in first cam 40. Pin 42 is distal from lock 44 in first cam 40. FIG. 6 shows a side perspective of a portion of headrest mechanism 30 with clutch 38, first cam 40, pin 42, lock 44 and button 79 in the same position as is shown in FIG. 5.

As shown in FIG. 7, cross-member 78 of lock 44 is shown riding within slot 76 of rotatable shaft 36. Cable 56 circumnavigates clutch 38 and is attached to clutch 38 at stay 86.

Figure 8:
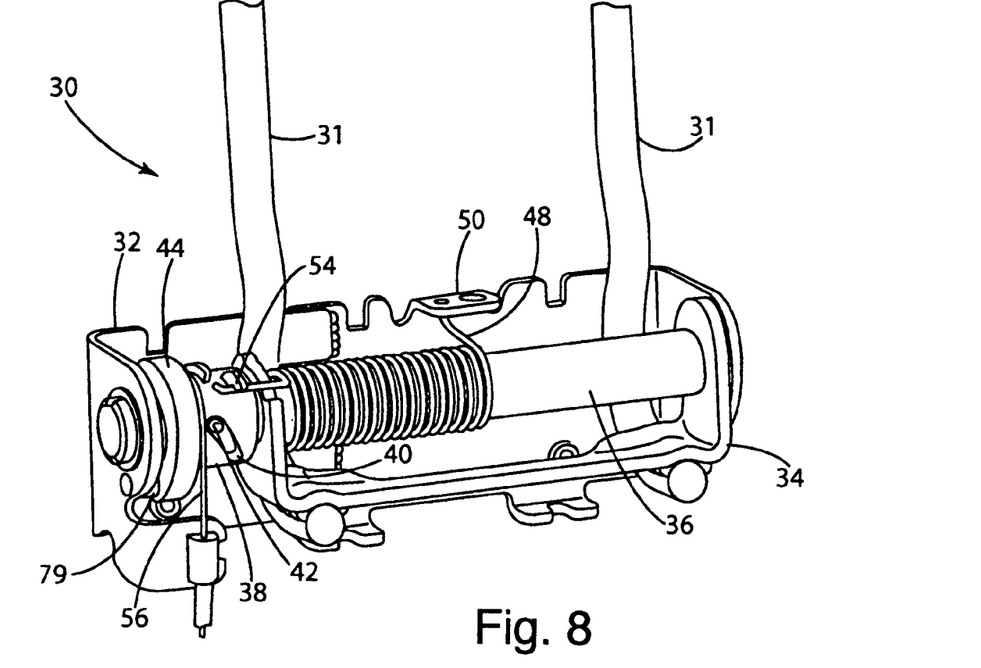
FIG. 8 shows the headrest mechanism is the extended, unlocked position.
Figure 9:
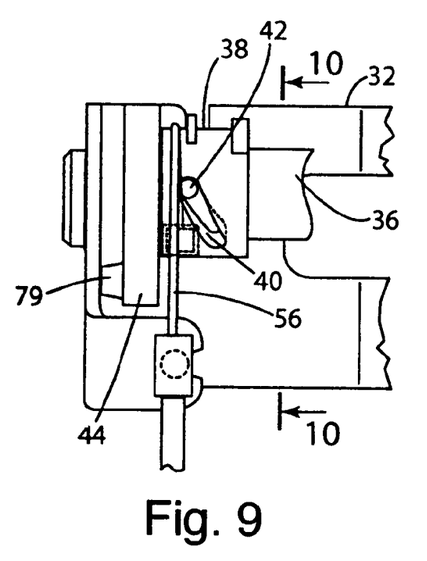
FIG. 9 is a front plan view the mounting bracket, rotatable shaft, clutch, lock and cable of the headrest in the extended, unlocked position.
Figure 10:
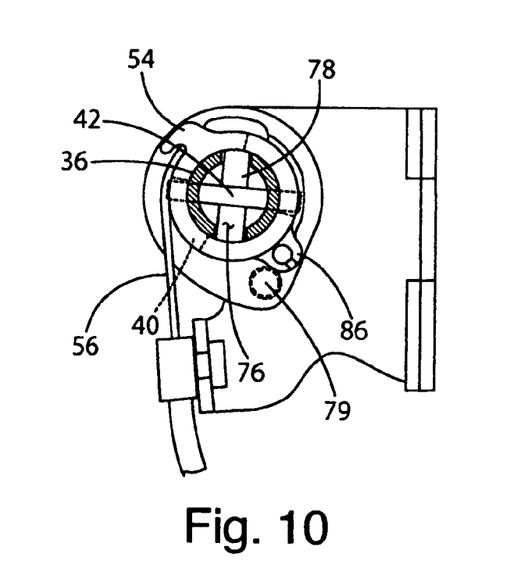
FIG. 10 is a side plan view the mounting bracket, rotatable shaft, clutch, lock and cable of the headrest in the extended, unlocked position.

FIGS. 8–10 show the headrest mechanism 30 in the unlocked position, but prior to movement of rotation bracket 34. Headrest 20 is in the extended position. In FIG. 8, a force has been exerted by cable 56 on clutch 38, causing clutch 38 to rotate. When clutch 38 rotates, pin 42 moves within first cam 40 to a position proximal to lock 44. This movement allows button 79 to disengage from mounting bracket 32. Rotation of clutch 38 results in movement of lever arm 54, which causes spring 46 to become more compressed.

FIG. 9 shows button 79 disengaged from mounting bracket 32. Pin 42 is shown in first cam 40 in a position proximal to lock 44. FIG. 10 shows the movement of lever arm 54. Lock 44 has moved along rotatable shaft 36. Cross-member 78 slides within slot 76.

Figure 11:
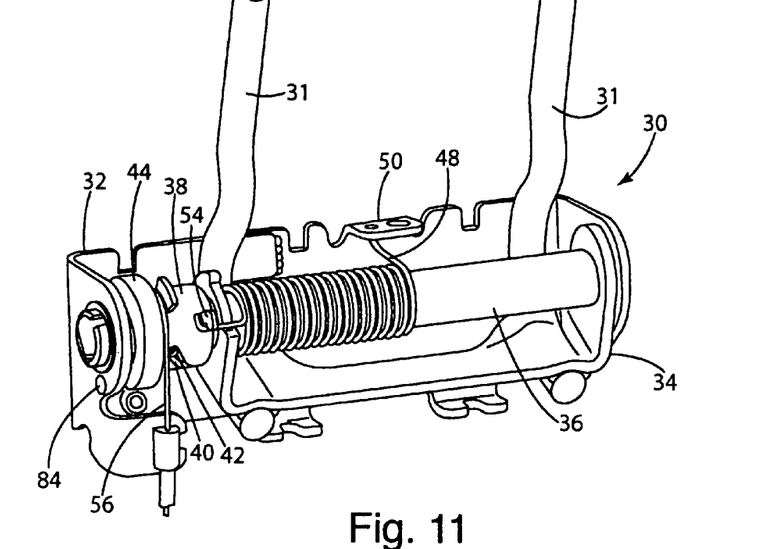
FIG. 11 shows the headrest mechanism is the unlocked, partially stowed position
Figure 12:
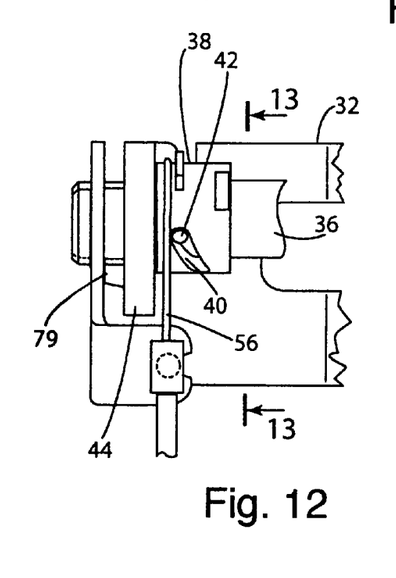
FIG. 12 is a front plan view the mounting bracket, rotatable shaft, clutch, lock and cable of the headrest in the unlocked, partially stowed position.
Figure 13:
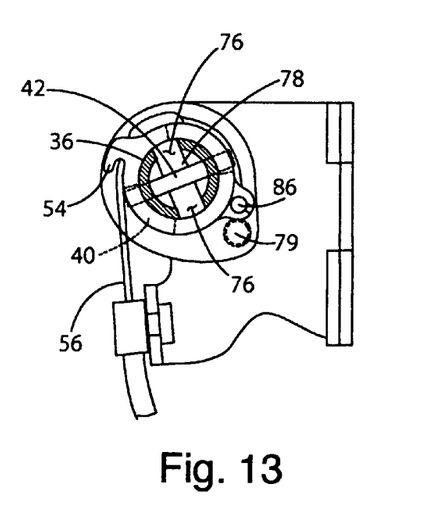
FIG. 13 is a side plan view the mounting bracket, rotatable shaft, clutch, lock and cable of the headrest in the unlocked, partially stowed position.

FIGS. 11–13 shows the headrest mechanism 30 with button 79 disengaged from mounting bracket 32. Rotation bracket 34 has been pivoted. Headrest 20 is in the partially stowed position. Rotation bracket 34 has been rotated forward. By following first cam 40, pin 42 has moved into a proximal position with lock 44. Clutch 38 will no longer rotate relative to rotatable shaft 36, thus causing rotatable shaft 36 and rotation bracket 34 to turn. As shown, button 79 is no longer within button aperture 84.

Rotation bracket 34 can continue to turn, until the back portion of rotation bracket 34 comes into contact with stop 50. When the back portion of rotation bracket 34 comes into contact with stop 50, then headrest 20 would be in the stowed position. Stop 50 can be positioned on rotation bracket 34 so that rotation bracket can pivot only a predetermined number of degrees.

As clutch 38 turns in a first direction, spring 46 is compressed. Spring 46 exerts a force on lever arm 54 in a direction opposite to that of the to the rotation. Thus, when tension on cable 56 is removed, then spring 46 by way of lever arm 54 causes clutch 38 to rotate in a second direction. The second direction is opposite to that of the first direction. Pin 42 travels from its position proximal to lock 44 to a position distal from lock 44, whereupon pin 42 causes rotatable shaft 36 and rotation bracket 34 to turn. Button 79 will eventually reengage with button aperture 84, thus preventing further movement of the rotatable shaft 36.

As noted previously, clutch 38 has second cam 77. Pin 42 also extends into second cam 77. The operation of pin 42 and second cam 77 is similar to the operation of pin 42 and first cam 40. As can be seen, while the pin moves within cams 40, 77, bun 33 does not move. When pin 42 reaches the end of cams 40, 77, then bun 33 begin pivoting about the rotatable shaft 36. Thus, the length of cam 40, 77 determines the period of time before bun 33 begins to move. The angle of cam 40 and second cam 77 with the clutch axis determines the length of cam 40, 77 and thus determines the period of time which elapses prior to movement of bun 33.

Figure 14:
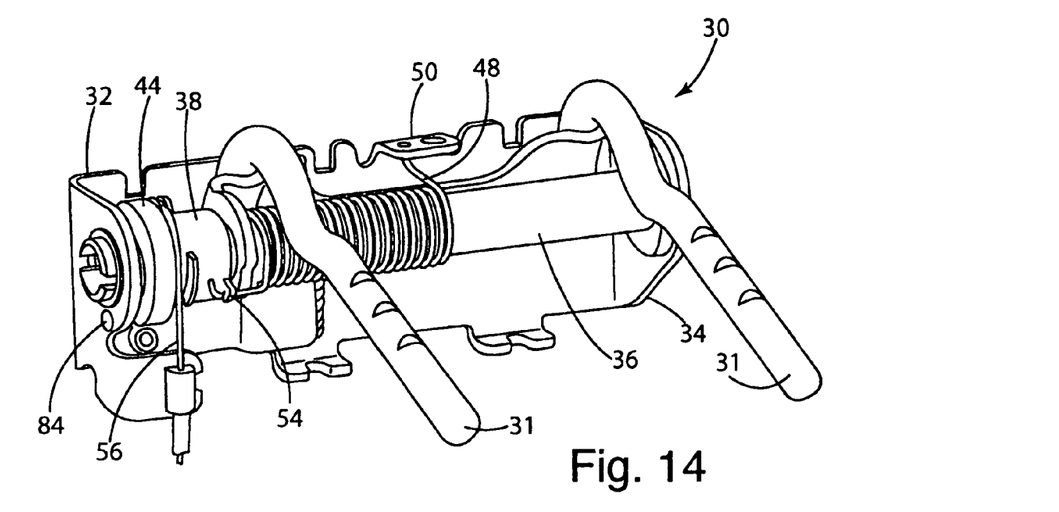
FIG. 14 shows the headrest mechanism is the unlocked, stowed position.
Figure 15:
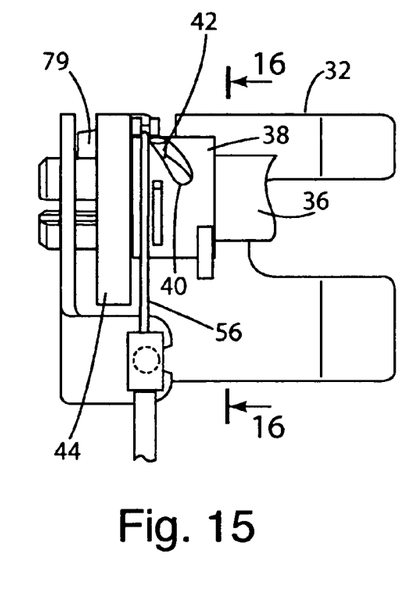
FIG. 15 is a front plan view the mounting bracket, rotatable shaft, clutch, lock and cable of the headrest in the unlocked, stowed position.
Figure 16:
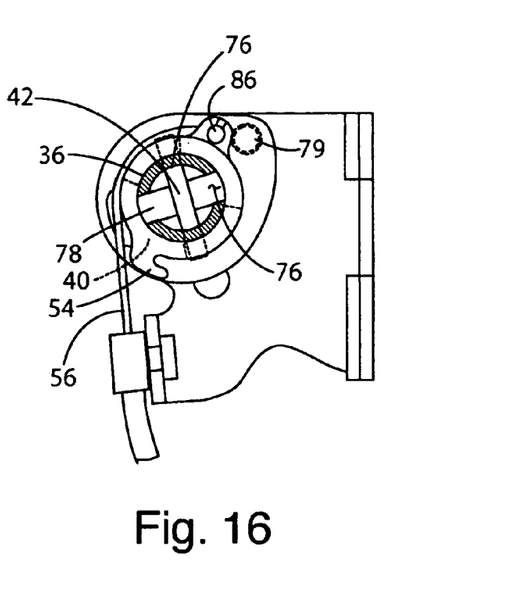
FIG. 16 is a side plan view the mounting bracket, rotatable shaft, clutch, lock and cable of the headrest in the unlocked, stowed position.

FIGS. 14–16 show the mechanism in the stowed position.

The above description is of the preferred embodiment. Various alterations and changes can be made without departing from the spirit and broader aspects of the invention as defined in the appended claims, which are to be interpreted in accordance with the principles of patent law including the doctrine of equivalents. Any references to claim elements in the singular, for example, using the articles "a," "an," "the," or "said," is not to be construed as limiting the element to the singular.

The embodiments of the invention in which an exclusive property or privilege is claimed are defined as follows:

1. A headrest for a seat having a seat pan and a seatback, the seatback capable of movement relative to the seat pan between an upright position and a folded position, comprising:
   a rotatable shaft;
   a bun pivotal about the rotatable shaft and moveable between an extended position and a stowed position; and
   an actuator for pivoting the bun between the extended position and the stowed position in response to movement of the seatback such that the bun is in the extended position when the seatback is in the upright position and the bun is in the stowed position when the seatback is in the folded position.

2. The headrest of claim 1 further comprising a clutch circumferentially located about the rotatable shaft capable of preventing pivoting of the bun from the extended position.

3. The headrest of claim 2 where a cable is attached to the clutch, and a force exerted on the cable causes the clutch to allow pivoting of the bun.

4. The headrest of claim 3 where a lock is juxtaposed with the clutch, the clutch prevents pivoting of the bun by engaging the lock.

5. The headrest of claim 4 where the clutch includes at least one cam.

6. The headrest of claim 5 where the lock is juxtaposed with the clutch.

7. The headrest of claim 6 where the lock is at least partially circumferentially located about the rotatable shaft.

8. The headrest of claim 7 including a spring, the spring biasing the clutch against the lock.

9. The headrest of claim 8 where the spring is at least partially located circumferentially about the rotatable shaft.

10. The headrest of claim 9 where the clutch has a latch.

11. The headrest of claim 10 where the latch connects the clutch with the lock.

12. The headrest of claim 11 where the lock includes a cross-member.

13. The headrest of claim 12 where the rotatable shaft includes at least one slot.

14. The headrest of claim 13 where the cross-member is slideably engaged with the rotatable shaft.

15. The headrest of claim 14 where the spring is attached to the clutch.

16. The headrest of claim 15 where the clutch has a first cam.

17. The headrest of claim 16 where a pin extends from the rotatable shaft and rests with the first cam.

18. The headrest of claim 17 where the clutch is substantially cylindrical, the clutch has a clutch axis, and the first cam is positioned on the clutch at an angle with the clutch axis.

19. The headrest of claim 18 where the angle is more than about 30 degrees with the clutch axis.

20. The headrest of claim 19 where the angle is more than about 45 degrees with the clutch axis.

21. The headrest of claim 20 where the clutch has a second cam, and the second cam is positioned on the clutch at the angle.

22. The headrest of claim 21 where the pin is within the second cam.

23. The headrest of claim 22 where the rotatable shaft is attached to a rotation bracket.

24. The headrest of claim 23 where the bun is attached to the rotation bracket.

25. The headrest of claim 24 where the rotation bracket has at least one prong.

26. The headrest of claim 25 including a mounting bracket, the mounting bracket attachable to the seat.

27. The headrest of claim 26 where the rotation bracket is attached to the mounting bracket.

28. The headrest of claim 27 where the rotation bracket moves relative to the mounting bracket.

29. The headrest of claim 28 where the rotation bracket is contained within the mounting bracket.

30. The headrest of claim 29 where the rotation bracket includes a first mounting bracket hole and a second mounting bracket hole.

31. The headrest of claim 30 where the rotatable shaft is mounted in the first mounting bracket hole and the second mounting bracket hole.

32. The headrest of claim 31 where the spring is attached to the mounting bracket.

33. The headrest of claim 32 where the mounting bracket includes a stop, and the stop is positioned so as to prevent pivoting of the rotation bracket more than a predetermined number of degrees.

34. The headrest of claim 33 where pivoting of the rotation bracket in a first direction compresses the spring.

35. The headrest of claim 34 where the lock has a locked position such that the bun cannot move from the extended position when the lock is in the locked position and the lock has an unlocked position such that the bun can be moved from the extended position when the lock is in the unlocked position, and the spring when compressed tends to move the lock into a locked position.

36. A vehicle seat for a motor vehicle comprising:
   a seat pan;
   a seatback moveable between an upright position and a folded position;
   a headrest rotatable between an extended position and a stowed position, the headrest attached to the seatback by a mounting bracket, the headrest having a rotation bracket, the rotation bracket pivotally mounting to the mounting bracket;
   a lock attached to a rotatable shaft, the lock capable of being engaged with the mounting bracket to disable rotation of the rotatable shaft; and an actuator for rotating the headrest from the extended position when the seatback is in the upright position to the stowed position when the seatback is in the folded position.

37. The vehicle seat of claim 36 where the actuator is a cable, and the cable is attached to the seat pan and to the headrest.

38. The vehicle seat of claim 37 where the cable will exert a force on the headrest as the seatback is moved from the upright position to the folded position.

39. The vehicle seat of claim 38 where the headrest is attached to the seat by the mounting bracket.

40. The vehicle seat of claim 39 where the cable is attached to the rotation bracket, and the cable causes the rotation bracket to pivot as the seatback is moved from the upright position to the folded position.

41. The vehicle seat of claim 40 where the cable has a fixed length.

42. The vehicle seat of claim 41 where the mounting bracket includes a first mounting bracket hole and a second mounting bracket hole, and the rotatable shaft is rotatably mounted in the first mounting bracket hole and the second mounting bracket hole.

43. The vehicle seat of claim 42 including a clutch operably connected to the lock for controlling engagement of the lock with the mounting bracket.

44. The vehicle seat of claim 43 where the cable is connected to the clutch, and, if the cable applies a first force to the clutch, then the clutch disengages the lock from the mounting bracket.

45. The vehicle seat of claim 44 where the clutch is circumferentially located about the rotatable shaft, and the clutch can turn a first angular amount before the rotatable shaft turns.

46. The vehicle seat of claim 45 where the clutch, after it has turned a first angular amount, will engage with the rotatable shaft to cause the rotatable shaft to rotate.

47. The vehicle seat of claim 46 where a spring is circumferentially positioned about the rotatable shaft and attached to the clutch and to the mounting bracket, and where the spring pushes the clutch against the lock.

48. The vehicle seat of claim 47 where the clutch includes a latch, and the latch is attached to the lock.

49. The vehicle seat of claim 48 where the headrest rotates at least about seventy degrees when the seatback is moved from the upright position to the folded position.

50. A headrest for a seat having a moveable seatback, the seat adapted to be attached to a motor vehicle, the moveable seatback having an upright position and a forward folded position, comprising:
    a mounting bracket attachable to the seat;
    a rotatable shaft disposed within the mounting bracket;
    a rotation bracket fixedly attached to the rotatable shaft, and moveable between a first position and a second position;
    a cable attached such that movement of the moveable seatback from the upright position to the forward folded position causes the rotatable shaft to rotate, moving the rotation bracket from the first position to the second position; and
    a spring disposed axially about the rotatable shaft, the spring having a first spring end and a second spring end, the first spring end attached to the mounting bracket and the second spring end attached to the rotatable shaft.

51. The headrest of claim 50 where a lock prevents movement of the rotatable shaft.

52. The headrest of claim 51 where the lock is disposed circumferentially about a portion of the rotatable shaft.

53. The headrest of claim 52 where the lock is engagable with the mounting bracket.

54. The headrest of claim 53 where a clutch is configured so as to control engagement of the lock with the mounting bracket.

55. The headrest of claim 53 where the lock has a button, and the mounting bracket has a button aperture, and the lock is engaged with the mounting bracket when the button is within the button aperture.

56. The headrest of claim 55 where a clutch is circumferentially disposed about the rotatable shaft and juxtaposed with the lock such that movement of the clutch causes the button to ingress into the button aperture.

57. The headrest of claim 56 where movement of the clutch causes the button to egress the button aperture.

58. The headrest of claim 57 where the spring is configured to push the clutch against the lock.

59. The headrest of claim 58 where the spring is circumferentially disposed about the rotatable shaft.

60. The headrest of claim 59 where the clutch has a lever arm, and the second spring end is attached to the lever arm.

61. The headrest of claim 60 where the rotatable shaft has a first rotatable shaft end, and a slot is axially disposed within the first rotatable shaft end.

62. The headrest of claim 61 where the lock has a cross-member and the cross-member is moveable within the slot.

63. The headrest of claim 62 where the cable has a first cable end and a second cable end, and the first cable end is attached to the clutch.

64. The headrest of claim 63 where the second cable end is attachable to the seat.

65. The headrest of claim 64 where the second cable end is attachable to the motor vehicle.

66. The headrest of claim 65 where the mounting bracket has a stop, and the stop prohibits movement of the rotation bracket after the rotation bracket reaches the second position.

67. The headrest of claim 66 where the first spring end is attached to the mounting bracket at the stop.

68. The headrest of claim 67 where the clutch has a cam and the rotatable shaft has a pin.

69. The headrest of claim 68 where the pin is moveably disposed within the cam.

70. The headrest of claim 69 where the pin is arranged so as traverse the cam when the rotation bracket pivots.

71. The headrest of claim 70 where the pin is located proximal to the first rotatable shaft end.

72. A headrest for a seat having a seatback capable of movement comprising:
    a rotatable shaft;
    a bun pivotal about the rotatable shaft and moveable between an extended position and a stowed position;
    an actuator for pivoting the bun between the extended position and the stowed position in response to movement of the seatback;
    a clutch circumferentially located about the rotatable shaft capable of preventing pivoting of the bun from the extended position; and
    a cable attached to the clutch such that a force exerted on the cable causes the clutch to allow pivoting of the bun.

73. The headrest of claim 72 where a lock is juxtaposed with the clutch, the clutch prevents pivoting of the bun by engaging the lock.

74. The headrest of claim 73 where the clutch includes at least one cam.

75. The headrest of claim 72 where the lock is juxtaposed with the clutch.

76. The headrest of claim 75 where the lock is at least partially circumferentially located about the rotatable shaft.

* * * * *